United States Patent [19]
Crisler et al.

[11] Patent Number: 5,515,379
[45] Date of Patent: May 7, 1996

[54] TIME SLOT ALLOCATION METHOD

[75] Inventors: Kenneth J. Crisler, Wheaton; Michael L. Needham, Palatine, both of Ill.

[73] Assignee: Motorola, Inc., Schaumburg, Ill.

[21] Appl. No.: 137,541

[22] Filed: Oct. 18, 1993

[51] Int. Cl.$^6$ .................................................. H04J 3/16
[52] U.S. Cl. ........................................ 370/95.3; 370/85.6
[58] Field of Search ...................... 370/60, 60.1, 85.2, 370/85.6, 85.7, 94.1, 94.2, 95.1, 95.3; 340/825.5, 825.51

[56] References Cited

U.S. PATENT DOCUMENTS

| | | | |
|---|---|---|---|
| 4,319,353 | 3/1982 | Alvarez, III et al. | 370/95.3 |
| 4,736,371 | 4/1988 | Tejima et al. | 370/95.1 |
| 5,197,125 | 3/1993 | Engel et al. | 370/95.3 |
| 5,239,545 | 8/1993 | Buchholz | 370/95.3 |
| 5,299,198 | 3/1994 | Kay et al. | 370/95.3 |
| 5,303,234 | 4/1994 | Kou | 370/95.3 |

OTHER PUBLICATIONS

Wong et al. "A Packet Reservation Multiple Access Protocol For Integrated Speech And Data Transmission", IEEE Proceedings–1, vol. 139, No. 6, Dec. 1992, pp. 607–612.

*Primary Examiner*—Hassan Kizou
*Attorney, Agent, or Firm*—Timothy W. Markison; Daniel C. Crilly

[57] ABSTRACT

Time slots may be allocated within a communication system when a communication unit transmits a first packet to a time slot allocator. Upon receiving the first packet, the time slot allocator determines whether the first packet contains a request for allocation of n-time slots or a request to transmit multiple packets. When the first packet contains the request for allocation of n-time slots, the time slot allocator allocates the n-time slots to the communication unit when the n-time slots are available, wherein the n-time slots are allocated contiguous in time. When the first packet contains the request to transmit multiple packets, the time slot allocator allocates time slots to the communication unit until the multiple packets have been transmitted, wherein the time slots are allocated contiguous in time.

8 Claims, 3 Drawing Sheets

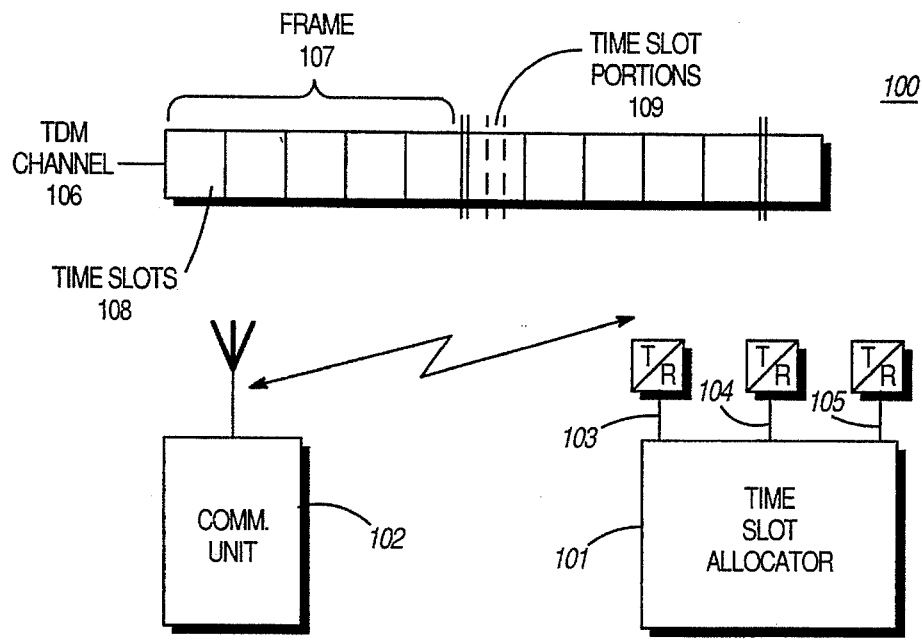
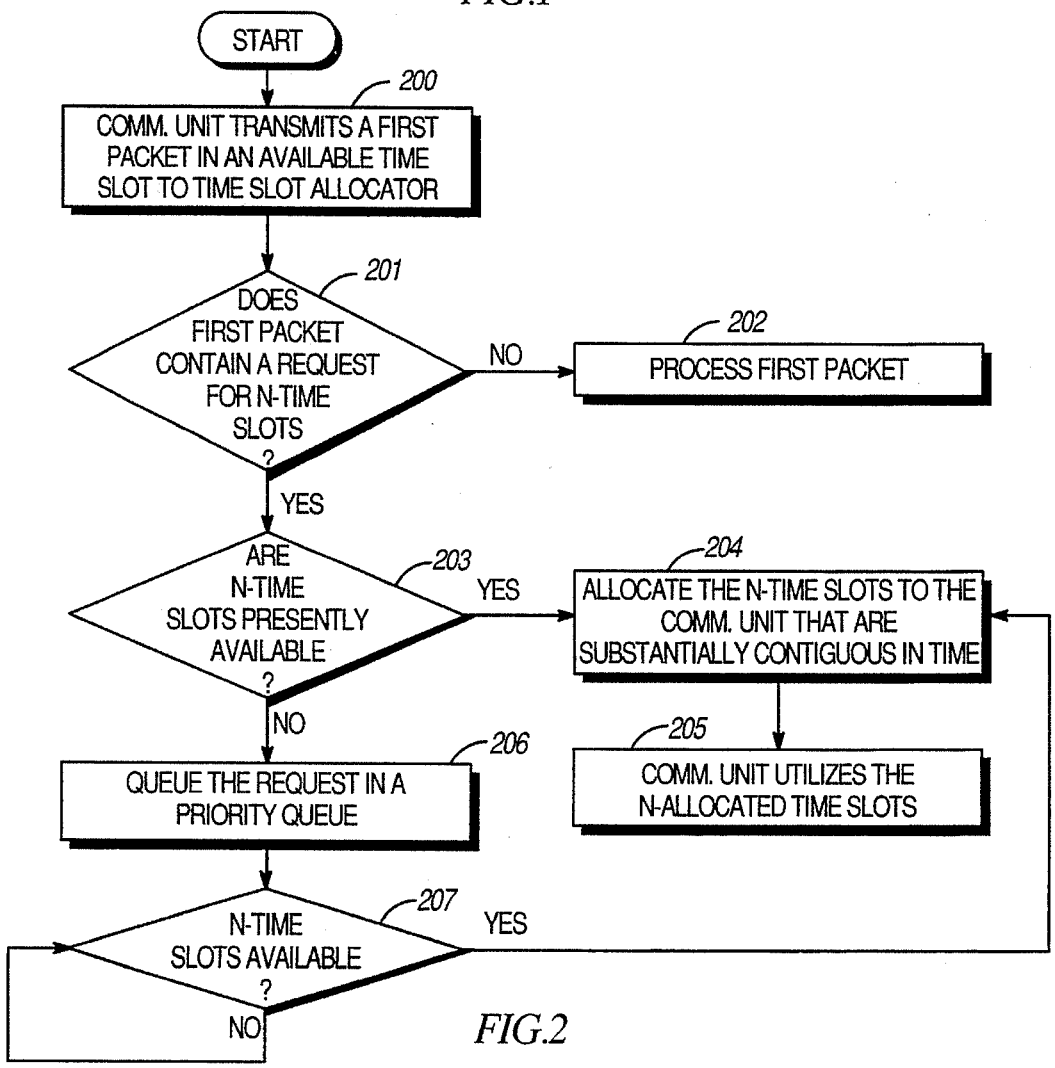
FIG.1
FIG.2

TIME SLOT ALLOCATION METHOD

FIELD OF THE INVENTION

The present invention relates generally to radio communication systems and, in particular, to a method for allocating time slots in a time division multiple access communication system.

BACKGROUND OF THE INVENTION

Radio communication systems are known to include a plurality of communication units that transceive information over communication resources via a plurality of base stations, or repeaters. Generally, radio communication systems also include a central controller, or communication resource allocator, that allocates the communication resources to the communication units. The communication units may be mobile radios, portable radios, or radiotelephones; whereas, the communication resources may be frequency carriers, pairs of frequency carders, time slots, pairs of time slots, or combinations of time slots and frequency carriers, depending on the multiplexing scheme incorporated in the communication system. In a time division multiple access (TDMA) communication system, the communication resources comprise time slots or time slot pairs.

Utilization of time slots by communication units in a TDMA communication system is commonly accomplished using two known protocols, those being: slotted ALOHA and reservation ALOHA. With a slotted ALOHA protocol, each transmitting communication unit attempts to send its information in a randomly chosen time slot to a base station, or repeater. When the selected time slot is unoccupied, a communication unit's information is sent to the base station. However, when the random time slot is currently occupied, a "collision" of information occurs and the transmitted information does not reach the base station. Accordingly, the information must be re-transmitted if the base station is to receive the information.

Due to the randomness of the slotted ALOHA protocol, slotted ALOHA is a very inefficient method for transmitting data packets. For single data packets (i.e., packets resident in one time slot), the theoretical maximum throughput efficiency using slotted ALOHA is approximately thirty-seven percent. Thus, one in every three transmission attempts is successful during maximum channel loading. The other sixty-three percent of the transmissions require re-transmission attempts. For data messages requiring multiple data packets (i.e., messages resident in multiple time slots), each individual packet in the data message is transmitted using the slotted ALOHA protocol. Since each packet is subject to a possible "collision", throughput efficiency for large data messages is significantly worse than for a single packet transmission.

In contrast to slotted ALOHA, reservation ALOHA provides a more efficient procedure for transmitting long data messages by allocating time slots to communication units on an exclusive use basis. In reservation ALOHA, the multitude of time slots are divided into a plurality of time frames. Thus, each time frame includes a predetermined number of time slots (e.g., three time slots per time frame). A communication unit transmits a small data packet to the communication resource allocator (also called a time slot allocator) in one time slot of a particular time frame via the slotted ALOHA protocol. The small data packet includes a request for the number of time slots required to transmit the long data message. Upon receipt of the request packet, the time slot allocator allocates the requested number of time slots by reserving one time slot in each succeeding time frame to the requesting communication unit. Thus, the communication unit's transmission requires a substantially identical number of time frames as time slots to complete the transmission of the long data message. For example, when a communication unit requests four time slots via the request packet, the time slot allocator allocates one time slot in each of the next four consecutive time frames.

Although reservation ALOHA provides improved throughput efficiency for transmitting long data messages by employing time slot reservation, it inherently introduces lengthy transmission time delays due to its time slot allocation procedure. As described above, a multiple slot data message requires multiple frame times to be transmitted. Thus, the time required to complete transmission of the multiple slot message is equivalent to the number of time frames necessary to transmit the message one slot at a time. Depending on data message length and time frame period, this delay may be excessive. For example, with a time frame period of forty-five milliseconds (fifteen milliseconds per time slot) and a data message length of four time slots, a transmission time of one hundred eighty milliseconds is required.

Therefore, a need exists for a time slot allocation method that substantially reduces the transmission time delay associated with prior art allocation procedures and improves the transmission channel throughput efficiency.

BRIEF DESCRIPTION OF THE DRAWINGS

FIG. 1 illustrates a time division multiple access communication system in accordance with the present invention.

FIG. 2 illustrates a logic flow diagram of steps executed by a time slot allocator and a communication unit in accordance with the present invention.

DESCRIPTION OF A PREFERRED EMBODIMENT

Figure 3:
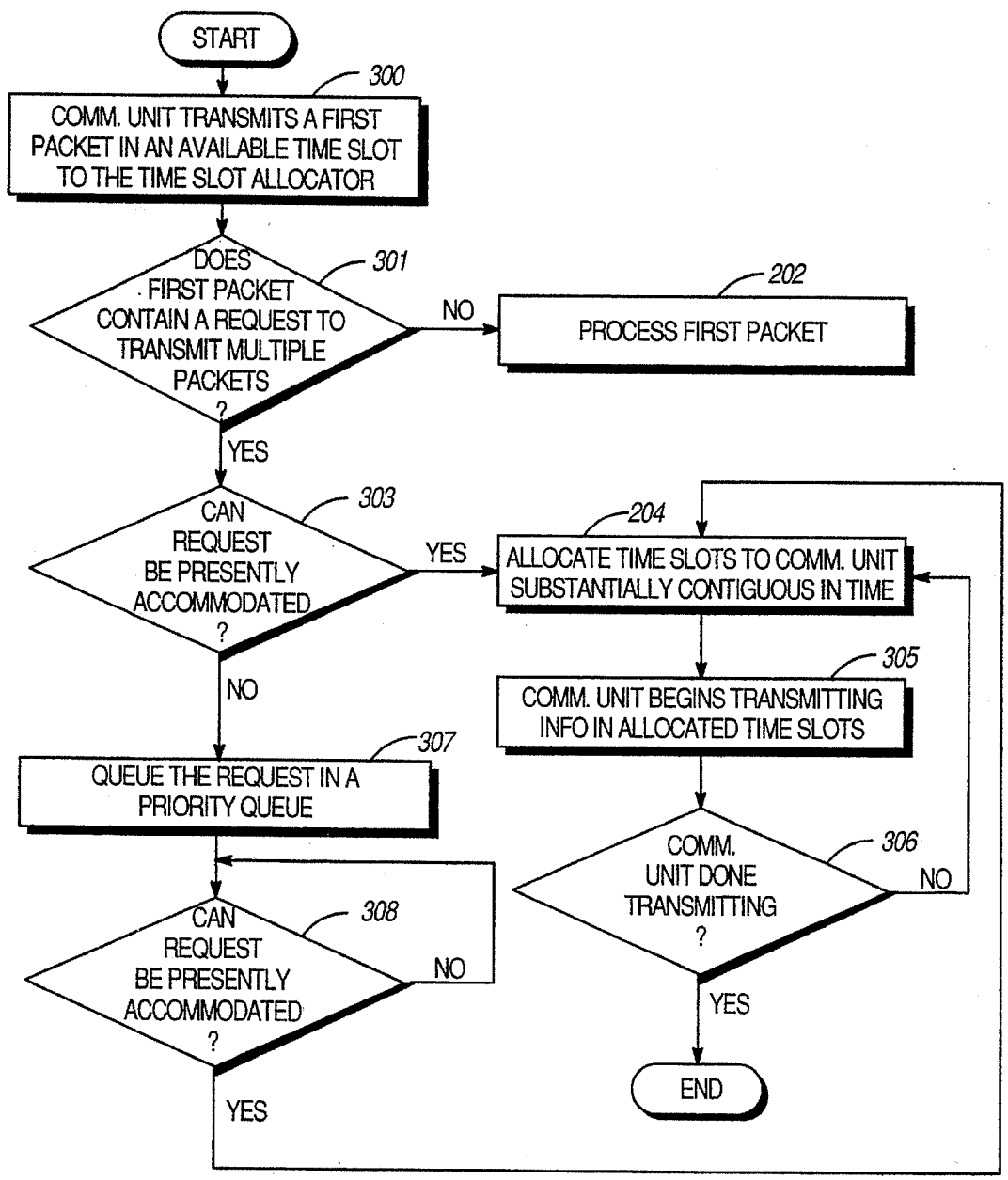
FIG. 3 illustrates an alternative logic flow diagram of steps executed by a time slot allocator and a communication unit in accordance with the present invention.

Generally, the present invention provides a method for allocating a plurality of time slots to multiple communication units in a communication system. This is accomplished when a communication unit transmits a first packet to a time slot allocator in an available time slot. The first packet may include a request for allocation of n-time slots or a request to transmit multiple packets. Upon receiving the first packet, the time slot allocator determines the type of request. When the request is for n-time slots, the time slot allocator allocates the n-time slots substantially contiguous in time to the communication unit when the n-time slots are available. When the request is for multiple packets, the time slot allocator allocates time slots substantially contiguous in time to the communication unit until the multiple packets have been transmitted. By allocating time slots in this manner, a more efficient utilization of communication channel bandwidth is attained over a wide range of channel loading conditions in comparison to prior art methodologies.

The present invention can be more fully described with reference to FIGS. 1–5. FIG. 1 illustrates a time division multiple access (TDMA) communication system 100 that includes a time slot allocator 101, a plurality of communication units 102 (one shown), and a plurality of base stations, or repeaters 103–105 (three shown). The communication unit 102, which may be a mobile radio, portable radio, or radiotelephone, transceives information via a time division multiplex (TDM) channel 106. The TDM channel 106 is comprised of time slots 108 and time slot portions 109 that are typically grouped into time frames 107. Thus, each time frame 107 includes a predetermined number of time slots 108. The time slot allocator 101, which may be a central controller or digital logic circuitry contained within the base stations 103–105, allocates the time slots 108 and time slot portions 109 to the communication unit 102 when the communication unit 102 requests to communicate.

Operation of the TDMA communication system 100 generally occurs in the following manner. When a communication unit 102 desires to transmit a data message, it examines the TDM channel 106 in search of an available time slot 108 or time slot portion 109. An available time slot 108 constitutes a time slot 108 that has not been allocated by the time slot allocator 101 to another communication unit 102 or is not otherwise in use for other communication services. Similarly, an available time slot portion 109 comprises a currently unallocated time slot portion 109. When an available time slot 108, or an available time slot portion 109, is found, the communication unit 102 utilizes it to transmit a first packet to the time slot allocator 101. Typically, the first packet either contains a time slot allocation request or data. When the first packet comprises a time slot allocation request, the first packet identifies the number of time slots necessary to completely transmit the communication unit's data message.

Regardless of the first packet's content, the first packet is received by the time slot allocator 101 via one of the base stations 103–105. When the first packet contains a time slot allocation request, the time slot allocator 101 allocates the desired number of time slots 108 to the communication unit 102 when they are available. However, when the desired number of time slots are unavailable due to previous time slot allocations, the time slot allocator 101 queues the time slot allocation request until the requested number of time slots become available. When the first packet contains a data message, the time slot allocator 101 processes the first packet according to a predetermined processing procedure, such as extracting and decoding the data contained in the first packet.

FIG. 2 illustrates a logic flow diagram of steps executed to implement the present invention. Entering the flow diagram at the START block, logic flow proceeds to block 200 where a communication unit transmits a first packet in an available time slot to the time slot allocator. As briefly mentioned above, the first packet may contain a single data packet or a request for allocation of n-time slots. When only a small quantity of data needs to be transmitted (i.e., an amount of data which fits entirely in the first packet), the first packet contains a single data packet. The single data packet generally includes data and other necessary information, such as addressing or error coding which is required for correct reception and processing of the data. When a large amount of data needs to be sent (i.e., an amount of data which cannot entirely fit in the first packet), the first packet contains a request for allocation of n-time slots. For this case, the first packet includes the number of time slots (n) required to transmit the entire quantity of data and an identification code of the requesting communication unit. Since this type of time slot allocation request occupies a small amount of informational bandwidth, or time, the first packet may be transmitted in a portion of a time slot. Thus, by dividing each available time slot into equal size portions, multiple communication units may transmit time slot allocation requests in a given available time slot.

Various known multiple access methods may be used for determining which communication unit may utilize an available time slot, or time slot portion, for transmission of the first packet. Some examples of these access methods include the slotted-ALOHA protocol, carrier sense multiple access (CSMA), and polling. Thus, no further discussion will be presented except to facilitate an understanding of the present invention.

Upon receiving the first packet, the time slot allocator determines whether the first packet contains a request for n-time slots 201. When the first packet does not contain the request for n-time slots, the time slot allocator processes the first packet based on a predetermined processing procedure 202. In this case, as detailed above, the first packet contains a single data packet. Therefore, the time slot allocator utilizes a predetermined processing procedure, such as extracting and decoding the data contained in the first packet, to process the received first packet. In addition, depending on the content of the extracted and decoded data, the time slot allocator may further process the data by relaying the data to another location.

When the first packet contains the request for n-time slots, the time slot allocator determines whether the n-time slots are presently available 203. When the n-time slots are presently available, the time slot allocator allocates the n-time slots to the communication unit such that the n-time slots are substantially contiguous in time 204. Thus, the n-time slots are allocated substantially adjacent to each other in a serial manner without any intervening time slots between them, except those time slots which are not available for data transmission. Time slots may be unavailable for data transmission because they are allocated to other services, such as system control activities. The contiguous allocation of the n-time slots extends for the length of the n-time slots. Therefore, depending on the number of time slots requested, the n-allocated time slots may occupy two or more consecutive time frames on the TDM channel. Upon allocation of the n-time slots, the communication unit utilizes the n-allocated time slots for transmitting information 205. Utilization of the n-contiguously allocated time slots results in improved channel throughput and less transmission time delay, especially under reduced channel loading conditions, compared to the known reservation ALOHA method (i.e., transmitting n-time slots in n-time frames at a rate of one time slot per time frame). Idle time slots residing between the allocated time slots in the reservation ALOHA technique are used in the present invention to transmit information. Thus, the present invention reduces transmission time and provides more efficient channel bandwidth utilization by utilizing the idle time slots.

When the n-time slots are not presently available 203, the time slot allocator queues the n-time slot request in a priority queue 206. Generally, the time slot allocator allocates the requested number of time slots to the highest priority time slot requests as the time slots become available. Priority may be determined according to the type of packet, such as high priority given to protocol control packets, or via an explicit priority parameter contained in the n-time slot request. Upon servicing the high priority requests, the queuing of the remaining time slot requests may follow a predetermined queue discipline, such as a first-in, first-out (FIFO) procedure. While the communication unit's time slot request is in the priority queue, the time slot allocator continues to monitor time slot availability 207. When the n-time slots become available, the time slot allocator allocates the n-time slots to the communication unit such that the n-time slots are substantially contiguous in time 204.

FIG. 3 illustrates an alterative logic flow diagram of steps executed to implement the present invention. Entering the flow diagram at the START block, logic flow proceeds to block 300 where a communication unit transmits a first packet in an available time slot to the time slot allocator. The first packet may contain a single data packet or a request to transmit multiple packets. As discussed with reference to FIG. 2, when only a small quantity of data needs to be transmitted (i.e., an amount of data which fits entirely in the first packet), the first packet contains a single data packet. When the communication unit has a large amount of data to send (i.e., an amount of data which cannot entirely fit in the first packet), the first packet contains a request to transmit multiple packets. In contrast to the method of FIG. 2, the request to transmit multiple packets constitutes a request for allocation of an unknown number of available time slots to the communication unit, with the allocation ending when the communication unit has completed its data transmission. For example, at the inception of a voice transmission, the communication unit does not know the quantity of information to be sent during the voice transmission. Thus, the communication unit cannot accurately determine the number of time slots needed for the voice transmission and, accordingly, sends a request to transmit multiple packets to the time slot allocator.

Similar to the request for n-time slots as described with reference to FIG. 2, the multiple packet transmission request occupies a small amount of informational bandwidth, or time, and preferably comprises an identification code of the requesting communication unit. Thus, due to the minimal amount of information in the multiple packet transmission request, the first packet may be transmitted in a portion of a time slot. Therefore, by dividing each available time slot into equal size portions, multiple communication units may transmit multiple packet transmission requests in a given available time slot.

Upon receiving the first packet, the time slot allocator determines whether the first packet contains a request to transmit multiple packets 301. When the first packet does not contain the request to transmit multiple packets, the time slot allocator processes the first packet based on the predetermined processing procedure 202. When the first packet contains the request to transmit multiple packets, the time slot allocator determines whether the request can be presently accommodated 303. When the request can be presently accommodated, the time slot allocator allocates time slots to the communication unit such that the time slots are substantially contiguous in time 204.

Upon allocation of the contiguous time slots, the communication unit begins transmitting information in the allocated time slots 305. The transmitted information generally comprises data or voice communications and other necessary information, such as error coding or addressing. While the communication unit is transmitting its information, the time slot allocator monitors the transmission to determine whether the communication unit has finished transmitting 306. While the communication unit is still transmitting, the time slot allocator continues to allocate contiguous time slots to the communication unit 204. When the communication unit has completed its transmission, the time slot allocator de-allocates any additional time slots previously allocated to the communication unit and the logic flow ceases at the END block. To indicate the end of the multiple packet transmission, the communication unit preferably transmits a data word as part of the last time slot's information to notify the time slot allocator of the transmission's conclusion.

When the request to transmit multiple packets cannot be presently accommodated due to lack of available time slots 303, the time slot allocator queues the multiple packet transmission request in a priority queue 307. As previously discussed with reference to block 206 of FIG. 2, the time slot allocator allocates contiguous time slots to the highest priority time slot requests as the time slots become available. Priority may be determined according to the type of packet, such as high priority given to protocol control packets, or via an explicit priority parameter contained in the multiple packet transmission request. Upon servicing the high priority requests, the queuing of the remaining time slot requests may follow a predetermined queue discipline, such as a first-in, first-out (FIFO) procedure. While the communication unit's multiple packet transmission request is in the priority queue, the time slot allocator continues to evaluate whether the queued request can be accommodated 308. When the request to transmit multiple packets can be accommodated, the time slot allocator allocates the contiguous time slots to the communication unit 204.

Figure 4:
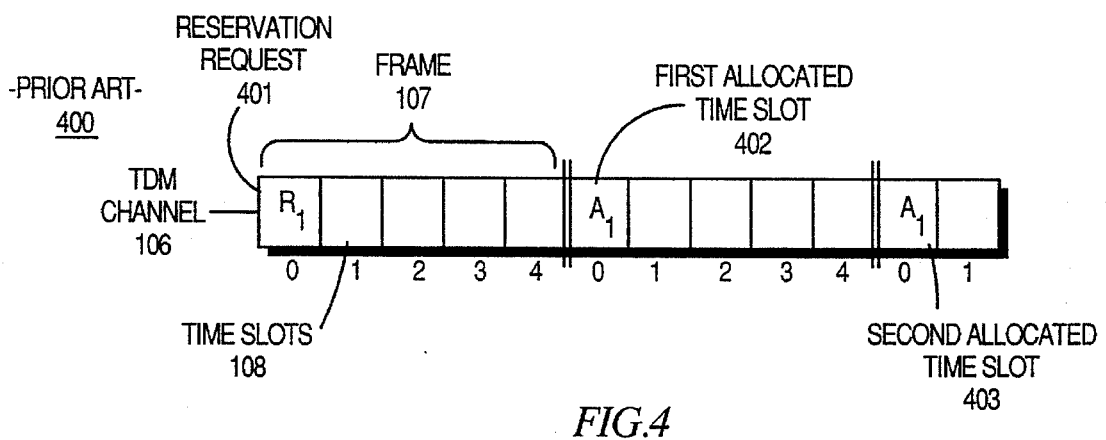
FIG. 4 illustrates a typical prior art time slot allocation.
Figure 5:
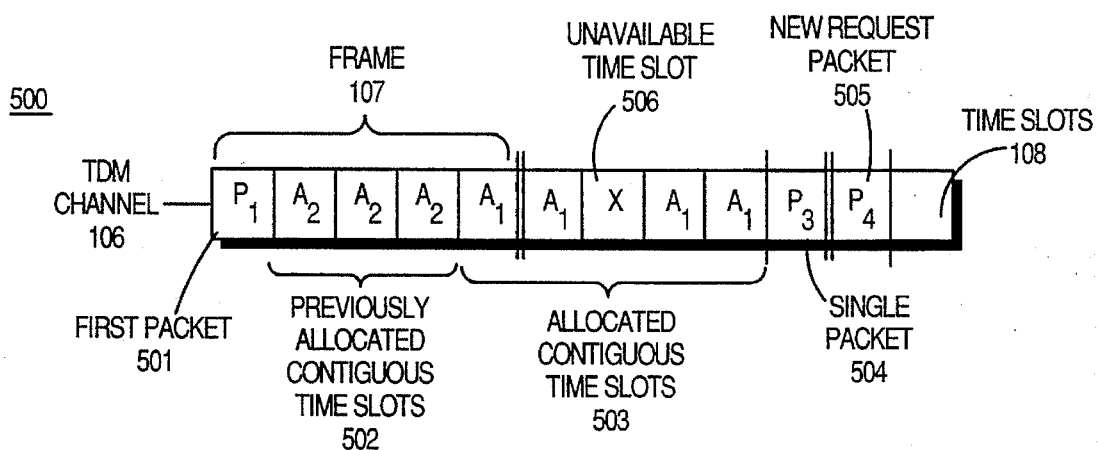
FIG. 5 illustrates time slot allocation in accordance with the present invention.

FIGS. 4 and 5 illustrate time slot allocation as implemented by a typical prior an methodology and the present invention, respectively. As previously mentioned with reference to FIG. 1, each TDM channel 400, 500 is divided into a series of time slots 108. A predetermined number of the time slots 108 are grouped to form time frames 107. In FIGS. 4 and 5, each time frame 107 comprises five time slots 108.

In the known prior art methodology of reservation ALOHA, time slots 108 are allocated on the TDM channel 400 by the time slot allocator. When a time slot is available, a communication unit transmits a data packet containing a reservation request $(R_1)$ 401 to the time slot allocator in the available time slot 108. The reservation request 401 includes the number of time slots 108 needed by the communication unit. Assume for purposes of this discussion that the reservation request 401 is transmitted in the first time slot 108 of the first time frame 107. Upon reception and subsequent processing of the reservation request 401 by the time slot allocator, the time slot allocator allocates the first time slot 108 of each subsequent time frame 107 to the communication unit for the equivalent number of time frames 107 corresponding to the desired number of time slots 108. Thus, the first allocated time slot $(A_1)$ 402 is in the first time slot 108 of the second time frame 107, the second allocated time slot $(A_1)$ 403 is in the first time slot 108 of the third time frame 107, and so on. Therefore, the reservation ALOHA method allocates one time slot 108 per time frame 107 to the requesting communication unit. As clearly evident with this procedure, most of the other time slots 108 on the TDM channel 400 remain unused during periods of few reservation requests 401 while the requesting communication unit incurs substantial transmission delay due to being allocated only a single time slot 108 in each time frame 107.

Similar to reservation ALOHA, the present invention utilizes a time slot allocator to allocate time slots 108 on the TDM channel 500. However, in contrast to the prior art, the present invention utilizes a more efficient allocation procedure. When a time slot 108 is available, a communication unit transmits a first packet $(P_1)$ 501 containing a request for allocation of n-time slots 108 to the time slot allocator in the available time slot 108. The n-time slot request includes the number of time slots (n) required by the communication unit. Assume for purposes of this discussion that the first packet 501 is transmitted in the first time slot 108 of the first time frame 107 and contains a request for four time slots 108. Upon reception and subsequent processing of the first packet 501 by the time slot allocator, the time slot allocator determines whether four substantially contiguous time slots 108 are available. As depicted in FIG. 5, the three contiguous time slots ($A_2$) 502 immediately following the first packet 501 have been previously allocated to another communication unit due to an earlier time slot request. Thus, these previously allocated contiguous time slots 502 are presently unavailable for allocation to the communication unit. Therefore, since the desired number of contiguous time slots 108 are presently unavailable, the time slot allocator queues the time slot request in a priority queue.

When the previously allocated contiguous time slots 502 have expired, the time slot allocator may allocate the n-time slots 108 requested by the communication unit. As detailed above, the time slots 108 are allocated such that the resulting allocated contiguous time slots ($A_1$) 503 are substantially contiguous in time. As shown in FIG. 5, the allocated contiguous time slots 503 reside in two consecutive time frames 107 and occupy the last time slot 108 in the first time frame 107 and the first, third, and fourth time slots 108 in the second time frame 107. Thus, due to the substantially contiguous nature of the time slot allocation provided by the present invention, a transmission requiring four time frame intervals in the prior art requires only a single frame time to complete. Therefore, the TDM channel 500, as allocated via the present invention, is more efficiently used and the requesting communication unit experiences less transmission delay than with the prior art technique. Note that the allocated contiguous time slots 503 are substantially contiguous, as opposed to definitively contiguous, since an unavailable time slot 506 prevents the time slot allocator from allocating four serially adjacent time slots 108 to the communication unit.

After the communication unit has utilized the allocated contiguous time slots 503, the time slots 108 are returned to the available state. Thus, another communication unit may use an available time slot 108 to transmit a single data packet ($P_3$) 504 or a new request packet ($P_4$) 505 to the time slot allocator. The single data packet 504 is immediately processed by the time slot allocator via the previously described predetermined processing procedure while the new packet request 505 is either queued or serviced depending on time slot availability.

The present invention provides a method for allocating time slots to multiple communication units in a communication system. With this invention, time slots are allocated to communication units in a substantially contiguous manner. Thus, the transmission time delay associated with prior art allocation techniques is substantially reduced. For example, with a time frame period of forty-five milliseconds (fifteen milliseconds per time slot) and a data packet length of four time slots, a transmission time of only sixty milliseconds is required as compared to a one hundred eighty millisecond transmission time using reservation ALOHA. Further, this reduction in transmission time delay inherently provides more efficient use of the TDM data channel over a wide range of channel loading conditions.

We claim:

1. In a communication system that includes a plurality of communication units, a plurality of time slots, and a time slot allocator, a method for a communication unit of the plurality of communication units to transmit multiple packets utilizing time slots of the plurality of time slots, the method comprising the steps of: at the communication unit:

a) transmitting a first packet in an available time slot of the plurality of time slots to the time slot allocator, wherein the first packet contains a request for allocation of an unknown number of time slots to transmit multiple packets;

b) upon allocation of a number of available time slots from the time slot allocator, transmitting the multiple packets in the allocated time slots, wherein the allocated time slots are substantially contiguous in time; and c) upon completion of the multiple packet transmission, transmitting a data word to the time slot allocator indicating an end of the multiple packet transmission, such that any remaining allocated time slots are de-allocated.

2. A method for a time slot allocator to allocate a plurality of time slots, the method comprising the steps of:

a) receiving a first packet from a communication unit in an available time slot of the plurality of time slots;

b) upon receiving the first packet from the communication unit, determining whether the first packet contains a request for allocation of an unknown number of time slots to transmit multiple packets;

c) upon determining that the first packet contains the request for allocation of an unknown number of time slots, allocating a number of available time slots to the communication unit until the multiple packets have been transmitted, wherein the time slots are allocated substantially contiguous in time; and d) de-allocating any remaining time slots allocated to the communication unit upon detection of an end of transmission from the communication unit.

3. The method of claim 2, further comprising the step of:

d) upon determining that the first packet does not contain the request for allocation of an unknown number of time slots, processing the first packet based on a predetermined processing procedure.

4. The method of claim 2, step (a) further comprising a step of receiving the first packet in the available time slot based on a slotted ALOHA protocol.

5. The method of claim 2, step (a) further comprising a step of receiving the first packet in a portion of the available time slot.

6. The method of claim 2, wherein the plurality of time slots are grouped into a plurality of time frames and wherein each time frame of the plurality of time frames includes a predetermined number of time slots, the allocation of step (c) further comprising a step of allocating the time slots, wherein the time slots are allocated substantially contiguous in time and reside in at least two consecutive time frames of the plurality of time frames.

7. The method of claim 2, wherein the allocation of step (c) further comprises the step of queuing the request for allocation of an unknown number of time slots until the time slots are available.

8. The method of claim 7, wherein the allocation of step (c) further comprises the step of prioritizing the queuing of the request for allocation of an unknown number of time slots.

* * * * *